United States Patent
Hopwood et al.

(10) Patent No.: US 7,865,952 B1
(45) Date of Patent: Jan. 4, 2011

(54) PRE-EMPTIVE APPLICATION BLOCKING FOR UPDATES

(75) Inventors: Scott Hopwood, Pymble (AU); Mark Greenwood, McMahons Point (AU)

(73) Assignee: Symantec Corporation, Mountain View, CA (US)

(*) Notice: Subject to any disclaimer, the term of this patent is extended or adjusted under 35 U.S.C. 154(b) by 917 days.

(21) Appl. No.: 11/743,029

(22) Filed: May 1, 2007

(51) Int. Cl.
G06F 11/00 (2006.01)
H04L 9/32 (2006.01)

(52) U.S. Cl. ............................. 726/22; 726/25; 726/26; 726/27

(58) Field of Classification Search ..................... 726/1, 726/22–30; 713/189, 191, 193–194
See application file for complete search history.

(56) References Cited

U.S. PATENT DOCUMENTS

| | | | |
|---|---|---|---|
| 6,385,725 B1 * | 5/2002 | Baum-Waidner | 713/175 |
| 7,540,013 B2 * | 5/2009 | Freund | 726/1 |
| 2006/0190606 A1 | 8/2006 | Kohavi | |
| 2006/0203815 A1 | 9/2006 | Couillard | |
| 2006/0206757 A1 | 9/2006 | Russell et al. | |
| 2006/0212932 A1 | 9/2006 | Patrick et al. | |
| 2006/0265630 A1 | 11/2006 | Alberti et al. | |

* cited by examiner

*Primary Examiner*—Hosuk Song
(74) *Attorney, Agent, or Firm*—Holland & Hart LLP

(57) ABSTRACT

Systems and methods are provided for pre-emptively isolating vulnerabilities, or potential vulnerabilities in a network. In one embodiment, application data corresponding to a plurality of software applications hosted by respective network devices is stored in a network database. Based on the application data, a set of applications is determined that correspond to a software update. The set of applications are then blocked such that they cannot be executed until the software update is applied or until it is determined that they do not include a vulnerability targeted by the software update. In some embodiments, applications are blocked when a vulnerability becomes known, even if a fix for the vulnerability is not yet known. In one embodiment, new devices attempting to connect to the network are restricted until known vulnerabilities are resolved.

25 Claims, 4 Drawing Sheets

PRE-EMPTIVE APPLICATION BLOCKING FOR UPDATES

TECHNICAL FIELD

This disclosure relates generally to software patch management. More particularly, this disclosure relates to systems and methods for isolating network vulnerabilities by blocking execution of potentially vulnerable applications and/or potentially vulnerable network devices that are attempting to connect to a network.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION OF EXAMPLE EMBODIMENTS

Figure 1:
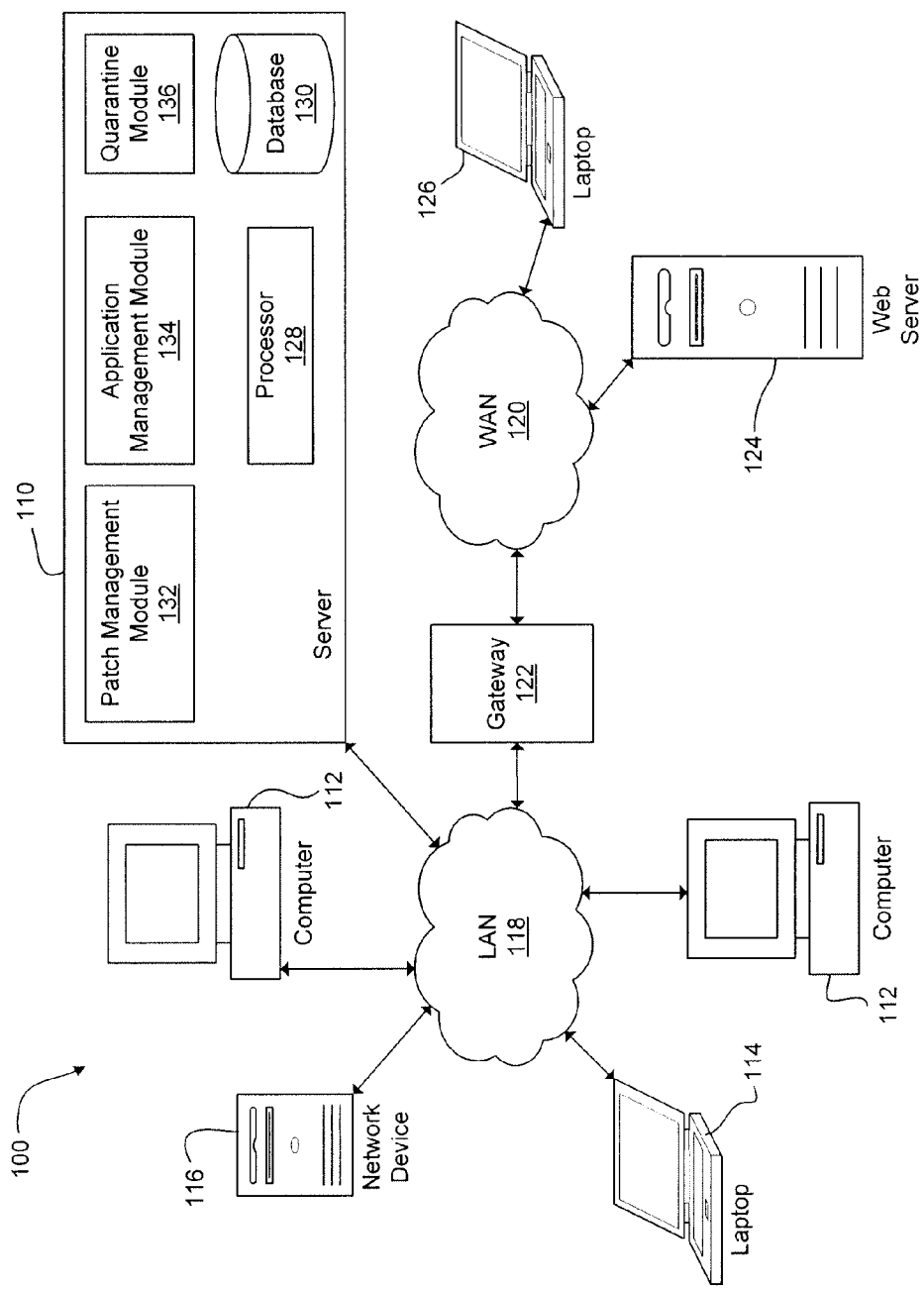
FIG. 1 is a block diagram of an example system having a server for pre-emptively isolating vulnerabilities according to one embodiment.

Systems and methods are provided for isolating potential vulnerabilities in a computer network. Vulnerabilities expose the network to viruses, worms, and malicious attacks, such as by hackers. To address vulnerabilities, software patches (also referred to herein as fixes or updates) are frequently published by software vendors to remedy problems with corresponding software products.

However, patch management may be time consuming or expensive, especially where several software products are installed on a large number of computers or other network devices. Further, different patches may be available for a particular vulnerability. For example, different patches may be available for, depending on the underlying software platform, different installation languages of the software product, different versions of the software product, or where one or more patches have already been installed.

The time span between the discovery of a vulnerability and an appearance of an exploit may be very short. For example, malicious attacks may target vulnerabilities before they are announced and before patches are available. Such attacks may be very damaging to a computer network and may be very difficult to remedy. Vulnerabilities may also exist in applications for which updates are not yet available to correct or protect against the vulnerabilities. Further, even when an update is available, a patching cycle that has not yet been executed or completed may expose the application, a host device and/or a computer network to the vulnerability.

Thus, according to certain embodiments disclosed herein, unpatched applications within a computer network default to a safe position (policy) rather than trying to "beat an attacker to the punch." When a new software update is released, a method according to one embodiment automatically denies access to any applications on a network corresponding to the software update.

The software update may have a set of rules used by a network administrator and/or patch management software to determine which applications and/or network devices may or should be updated. However, processing a large number of network devices according to the update's set of rules during a full update cycle may provide for a "vulnerability window" of time when one or more network devices and/or applications may become corrupted.

Thus, to reduce or eliminate vulnerability windows according to embodiments disclosed herein, application data stored in a central database is used to quickly identify which applications to block, even before an update cycle is started. The application data stored in the central database may include, for example, a list of applications residing on particular network devices, application versions, previously installed patches, and other information.

Because the application data stored in the central database is used to identify which applications to block, rather than waiting to apply the set of rules corresponding to the software update, some versions of an application may be blocked that do not actually require a software update. In certain embodiments, these applications can not be run until the full update cycle has completed, at which point all unpatched applications will be shown to be "safe" and, therefore, will be unblocked. Thus, the system defaults to a safe option by automatically blocking applications having potential vulnerabilities.

In addition, or in other embodiments, a user (e.g., a network administrator) may manually approve versions of applications that are allowed to run even though the update cycle has not been started or completed. Thus, network administrators may decide how aggressive to address vulnerabilities in different situations. While initially blocking all potentially vulnerable applications may be overly aggressive in certain situations, such an approach may represent the safest option for certain other situations.

In addition, or in other embodiments, vulnerability announcements may also be provided when updates are not yet available for a discovered vulnerability. Vulnerability announcements are like updates, but do not include remediation. A vulnerability announcement released after a vulnerability has been discovered but before a fix has been created may be used to block potentially dangerous applications as soon as the vulnerability announcement is released. When an update becomes available, the normal update is applied to unblock the applications. Thus, "zero day" threats or vulnerabilities may be handled in an aggressive manner.

In addition, or in other embodiments, new devices attempting to connect to the network are immediately quarantined or restricted until it is determined that they do not include a known vulnerability.

The embodiments of the disclosure will be best understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

Several aspects of the embodiments described will be illustrated as software modules or components. As used herein, a software module or component may include any type of computer instruction or computer executable code located within a memory device. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

FIG. 1 is a block diagram of an example system 100 having a server 110 for pre-emptively isolating vulnerabilities according to one embodiment. The system 100 may include, for example, desktop computers 112, laptop computers 114, and other network devices 116 (e.g., servers, printers, storage devices, etc.) in communication with the server 110 through a local area network (LAN) 118. The LAN 118 may include a private network and provide for wired and wireless network connections.

The LAN 118 may be connected to a wide area network (WAN) 120 through, for example, a gateway 122. The WAN 120 may include, for example, the Internet. Thus, users of the computers 112, 114 and other network devices 116 may gain access to, for example, remote web servers 124 through the LAN 118 and WAN 120. Further, other users of remote computers 126 may connect to the LAN 118 through the WAN 120 (e.g., using a secure connection) to access data and/or applications provided through the LAN 118.

The server 110 includes a processor 128, a database 130, and a patch management module 132. The processor 128 is configured to execute instructions for performing processes as disclosed herein and may include, for example, any general purpose single-chip or multi-chip microprocessors, digital signal processors, embedded microprocessors, microcontrollers, combinations of the forgoing, or the like. As discussed above, the database 130 may include, for example, a list of applications residing on particular computers 112, 114 or other network devices 116, application versions, previously installed patches, and other information. Although the database 130 is shown internal to the server 110 in FIG. 1, a person of ordinary skill in the art will recognize from the disclosure herein that the database 130 may be external to the server 110.

The patch management module 132 is configured to schedule and apply available updates to the computers 112, 114 and other network devices 116 connected to the LAN 118. When an update becomes available, a user such as a network administrator may decide whether the update is critical or should be applied to address a target vulnerability in the LAN 118.

If the network administrator decides that the update is needed, the patch management module 132 applies the update by cycling through the computers 112, 114 and other network devices 116. The patch management module 132 uses a set of rules corresponding to the update to determine which computers 112, 114 and other network devices 116 include an application having a vulnerability addressed by the update. The patch management module 132 then applies the update accordingly. After installing the update on a particular computer 112, 114 or other network device 116, the patch management module 132 may test the updated application to verify that the vulnerability has been corrected. In some embodiments, the particular computer 112, 114 or other network device 116 may need to be rebooted before testing the updated application.

In one embodiment, the server 110 also includes an application management module 134 that verifies whether one or more predetermined conditions are satisfied before allowing an application to execute.

When a system administrator instructs the patch management module 132 to apply a new software update, the patch management module 132 signals the application management module 134 to block or deny access to any applications corresponding to the update. In one embodiment, the patch management module 132 determines which applications to block on specific computers 112, 114 and other network devices 116 by accessing the application data stored in the database 130. The patch management module 132 then instructs the application management module 134 to block each identified application until the patch management module 132 updates the particular application or completes the full update cycle corresponding to the new software update.

In one embodiment, the patch management module 132 allows the system administrator or another user to selectively unblock particular applications before updating the particular application and/or before completing the full update cycle. Thus, if the system administrator is aware that the particular application on a particular device was previously updated and/or does not have the targeted vulnerability, the system administrator may grant immediate access to the application.

In one embodiment, the patch management module 132 signals the application management module 134 to block or deny access to any applications corresponding to a vulnerability announcement or other indication of a potential vulnerability. Vulnerability announcements may be provided by software vendors or other parties when a potential vulnerability is detected, even if the vulnerability does not yet have an available fix. In such an embodiment, the patch management module 132 determines which applications correspond to the potential vulnerability by accessing the application data stored in the database 130. The patch management module 132 then instructs the application management module 134 to block each identified application until the patch management module 132 tests the particular application to determine whether the particular application is subject to the announced vulnerability. If the particular application is subject to the announced vulnerability, the application management module 134 continues to block the particular application until a fix can be applied.

In one embodiment, the server 110 also includes a quarantine module 136 configured to deny network access to (or limit network communication of) computers 112, 114 and other network devices 116 under certain conditions. For example, the quarantine module 136 may deny network access when a particular computer 112 has a detected virus or does not have recent virus protection software updates. The quarantine module 136 isolates the particular computer 112 until the virus is removed and/or the virus protection software is updated.

In one embodiment, the quarantine module 136 also isolates any computer 112, 114 or other network device 116 attempting to make a new local connection to the LAN 118. In addition, or in other embodiments, the quarantine module 136 also isolates any computer 126 attempting to make a remote connection to the LAN 118 (e.g., through the WAN 120). The quarantine module 136 restricts any device attempting to connect to the LAN 118 to communication with the patch management module 132. In some embodiments, the quarantine module 136 may also allow locally connected computers 112, 114 or other locally connected network devices 116 to communicate with the WAN 120 through the gateway 122 and/or to access limited local network services such as printing.

In one embodiment, the quarantine module 136 continues isolating any device (e.g., computers/devices 112, 114, 116, 126) attempting to fully connect to the LAN 118 until the patch management module 132 has the opportunity to detect any vulnerabilities present on the device, apply any available updates to remove the vulnerabilities, and retest the device to determine that all vulnerabilities have been corrected. After the patch management module 132 determines that the vulnerabilities have been corrected, the quarantine module 136 allows the device to fully integrate with the LAN 118.

In one embodiment, the patch management module 132 and/or the quarantine module 136 allows the system administrator or another user to selectively allow particular devices to fully integrate with the LAN 118 before the patch management module 132 has the opportunity to detect and correct any vulnerabilities present on the device. Thus, if the system administrator is aware that the particular device was previously updated and/or does not have the targeted vulnerability, the system administrator may grant the device immediate access to the LAN 118.

Figure 2:
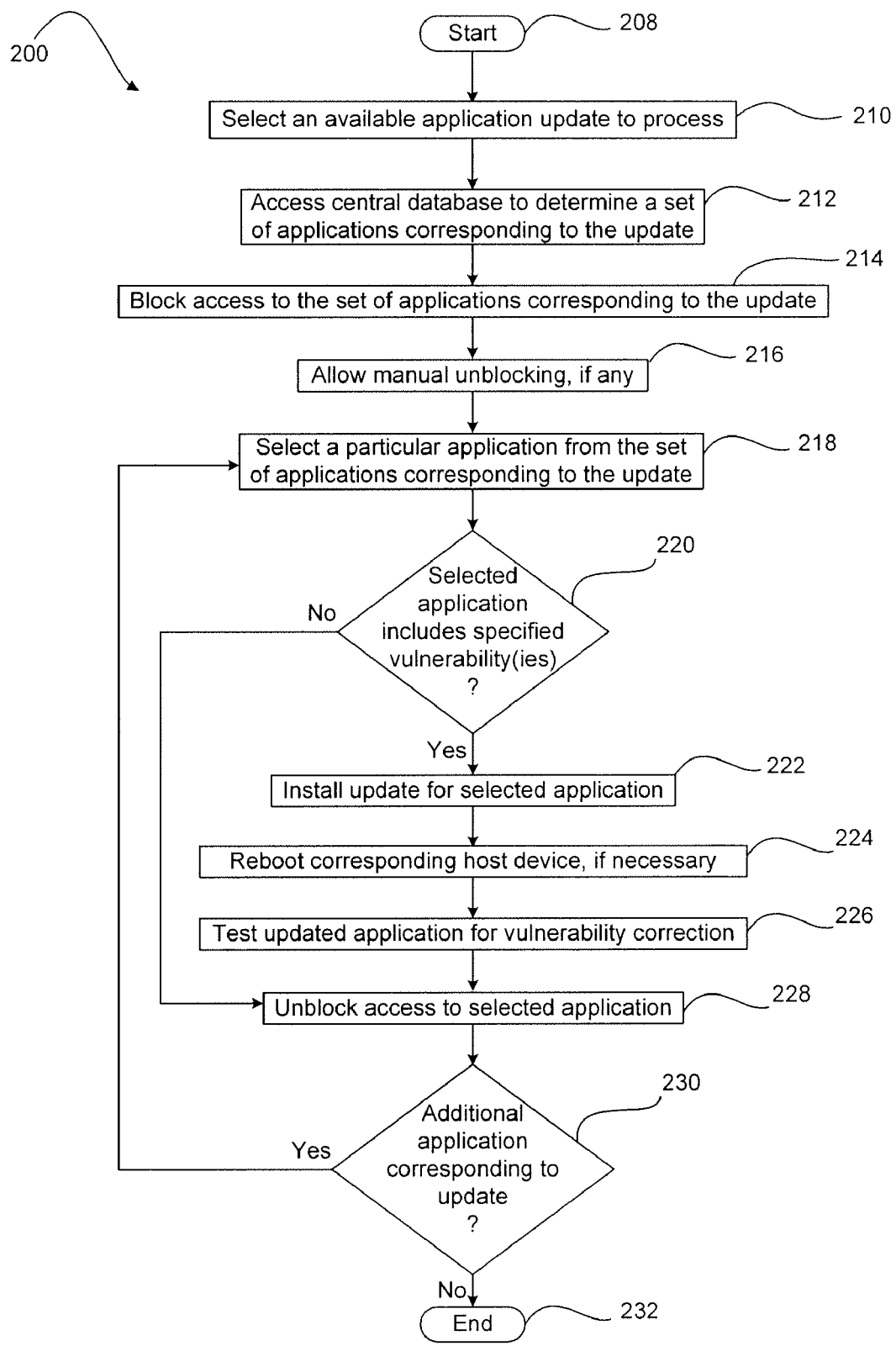
FIG. 2 is a flowchart of a process for pre-emptively blocking applications corresponding to pending updates according to one embodiment.

FIG. 2 is a flowchart of a process 200 for pre-emptively blocking applications corresponding to pending updates according to one embodiment. After starting 208, the process 200 includes selecting 210 an available application update to process and accessing 212 a central database to determine a set of applications corresponding to the update. The process 200 then blocks 214 access to the set of applications corresponding to the update. The process 200 also allows 216 a user to manually unblock any application in the set of applications corresponding to the update.

The process 200 then selects 218 a particular application from the set of applications corresponding to the update and queries 220 whether the selected application includes one or more specified vulnerabilities targeted by the update. If the selected application includes one or more of the specified vulnerabilities, the process 200 installs 222 the update for the selected application on a corresponding host device and, if necessary, reboots 224 the host device so as to enable the update. The process 200 then tests 226 the updated application for vulnerability correction and, if the update is successful, unblocks 228 access to the selected application. Although not shown in FIG. 2, if the update is not successful, the process 200 may continue to block access to the selected application until the vulnerabilities are resolved.

If, after querying 220, the process 200 determines that the selected application does not include one more vulnerabilities targeted by the update, the process 200 may immediately unblock 228 access to the selected application. In another embodiment, the process 200 may wait until the update cycle is complete for the entire set of applications corresponding to the update before unblocking the applications that do not require the patch.

The process 200 then queries 230 whether there is an additional application in the set of applications corresponding to the update. If there is an additional application, the process 200 selects 218 another application from the set of applications corresponding to the update and proceeds to apply the update as discussed above. If, however, there are no additional applications in the set of applications corresponding to the update, process 200 has completed the update and ends 232.

Figure 3:
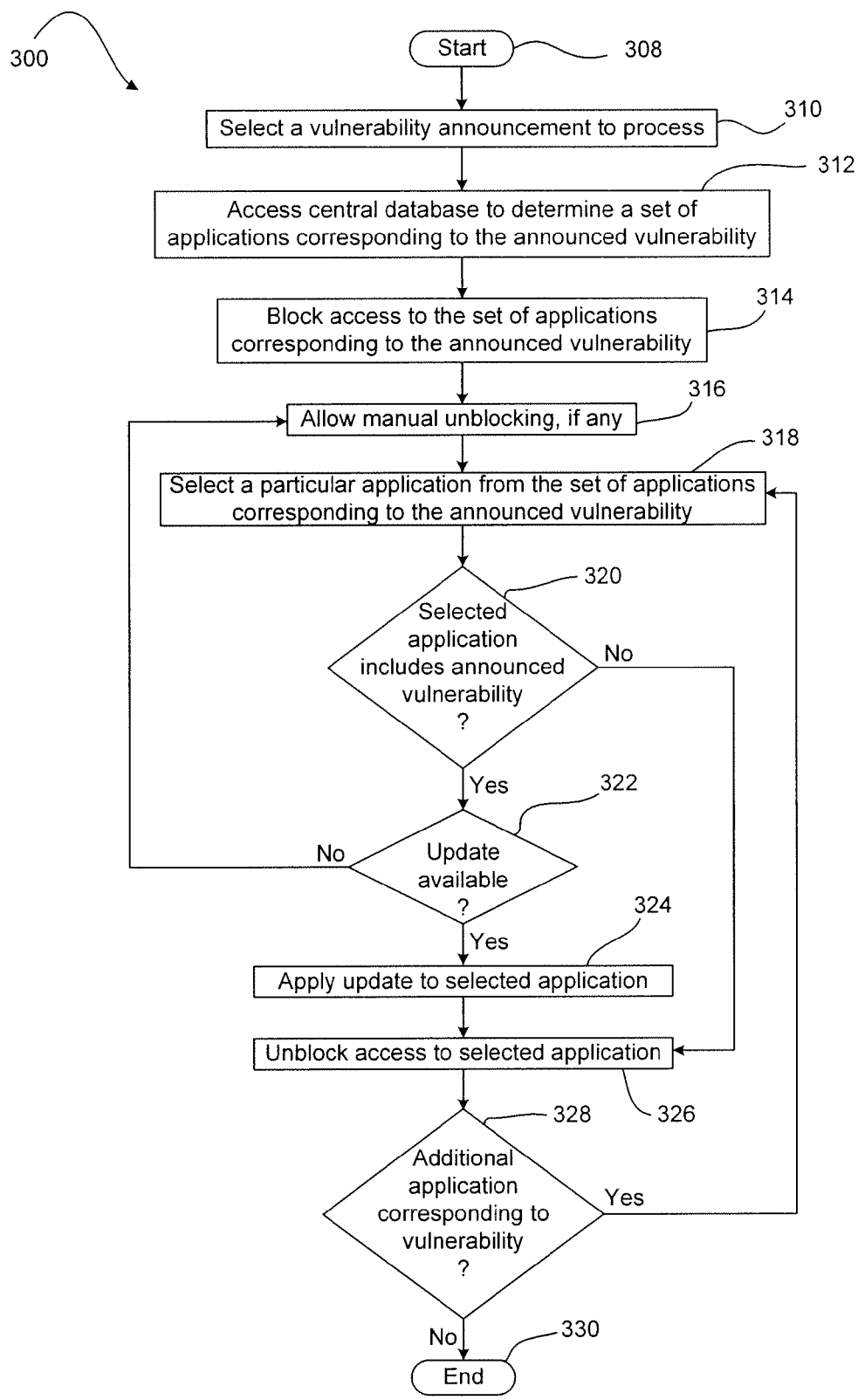
FIG. 3 is a flowchart of a process for pre-emptively blocking applications in response to a vulnerability announcement according to one embodiment.

FIG. 3 is a flowchart of a process 300 for pre-emptively blocking applications in response to a vulnerability announcement according to one embodiment. After starting 308, the process 300 includes selecting 310 a vulnerability announcement to process and accessing 312 a central database to determine a set of applications corresponding to the announced vulnerability. The process 300 then blocks 314 access to the set of applications corresponding to the announced vulnerability. The process 300 also allows 316 a user to manually unblock any application in the set of applications corresponding to the announced vulnerability.

The process 300 then selects 318 a particular application from the set of applications corresponding to the announced vulnerability and queries 320 whether the selected application includes the announced vulnerability. If the selected application includes the announced vulnerability, the process 300 queries 322 whether an update is available to correct the vulnerability. If an update is not available, the process 300 continues to allow 316 manual unblocking, if any, and waits for an update to become available. If, on the other hand, an update is available, the process 300 applies 324 the update to the selected application as discussed above and unblocks 326 access to the selected application. The process 300 also unblocks 326 the selected application if the selected application does not include the announced vulnerability.

The process 300 then queries 328 whether there is an additional update corresponding to the announced vulnerability. If there is an additional application corresponding to the announced vulnerability, the process selects 318 another application from the set of applications corresponding to the announced vulnerability and repeats the process discussed above. If there is not an additional application corresponding to the announced vulnerability, the process 300 ends 330.

Figure 4:
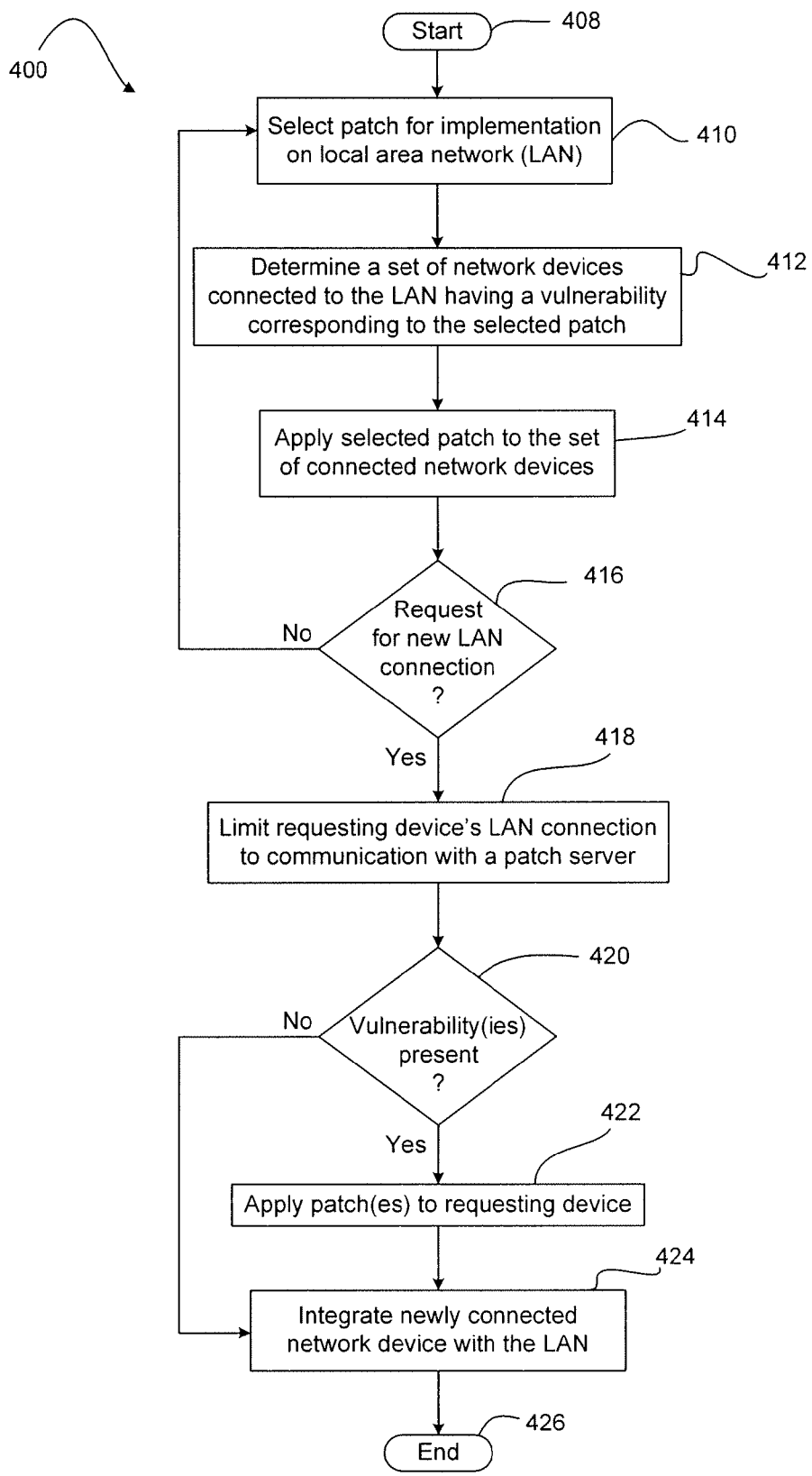
FIG. 4 is a flowchart of a process for pre-emptively isolating a device that is attempting to connect to a local area network (LAN) according to one embodiment.

FIG. 4 is a flowchart of a process 400 for pre-emptively isolating a device that is attempting to connect to a local area network (LAN) according to one embodiment. After starting 408, the process 400 includes selecting 410 a patch for implementation on the LAN 410. The process 400 also determines 412 a set of network devices already connected to the LAN that have a vulnerability corresponding to the selected patch and applies 414 the selected patch to the set of connected network devices.

The process 400 also queries 416 whether there is a request for a new LAN connection. If not, the process 400 continues selecting 410 patches for implementation on the LAN. If a request is received for a new LAN connection, the process 400 limits 418 the requesting device's LAN connection to communication with a patch server. Although not shown in FIG. 4, in other embodiments, the requesting device may also be granted access to limited LAN resources such as an Internet connection or printing capabilities.

The process 400 then queries 420 whether one or more vulnerabilities are present on the requesting device. If one or more vulnerabilities are present on the requesting device, the process 400 applies 422 one or more available patches to the requesting device to correct the vulnerabilities and integrates 424 the requesting device with the LAN. The process 400 also integrates 424 the requesting device with the LAN if there were no vulnerabilities present on the requesting device. Although not shown in FIG. 4, if patches are not available to correct the vulnerabilities, then the process 400 continues to limit 418 the requesting device's LAN connection.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A method for pre-emptively blocking execution of software applications in a network, the method comprising:
storing application data in a network database, the application data corresponding to a plurality of software applications hosted by respective network devices;
based on the application data, determining a first set of applications from among the plurality of software applications that correspond to a software update; and
setting the first set of applications in a default mode, wherein access to the first set of applications is blocked while in the default mode.

2. The method of claim 1, further comprising allowing a user to manually unblock access to a particular application in the first set of applications.

3. The method of claim 1, further comprising:
determining that a particular blocked application in the first set of applications does not include a vulnerability targeted by the software update; and
based on the determination, unblocking access to the particular application.

4. The method of claim 1, further comprising:
determining that a particular blocked application in the first set of applications includes a vulnerability targeted by the software update; and
based on the determination, installing the software update on the network device hosting the particular application.

5. The method of claim 4, further comprising:
testing the particular application to verify whether the installation of the software update corrected the vulnerability; and
based on the testing, unblocking access to the particular application.

6. The method of claim 1, wherein the application data stored in the network database comprises a list of applications and application versions residing on the respective network devices.

7. The method of claim 1, further comprising:
based on the application data, determining a second set of applications from among the plurality of software applications that correspond to a known vulnerability; and
blocking access to the second set of applications.

8. The method of claim 7, further comprising:
receiving a request to connect a new network device to the network; and
limiting the new network device's network connection to communication with a patch management module until the patch management module determines that the new network device does not include the known vulnerability.

9. A system for pre-emptively blocking execution of software applications, the system comprising:
a database configured to store application data corresponding to a plurality of software applications hosted by respective network devices;
a patch management module configured to determine, based on the application data stored in the database, a first set of applications from among the plurality of software applications that correspond to a software update; and
an application management module configured to set the first set of applications in a default mode, wherein access to the first set of application is blocked while in the default mode.

10. The system of claim 9, wherein the patch management module is further configured to allow a user to manually unblock a particular application in the first set of applications.

11. The system of claim 9, wherein the application management module is further configured to determine that a particular blocked application in the first set of applications does not include a vulnerability targeted by the software update, and wherein the application management module is further configured to unblock the particular application based on the determination.

12. The system of claim 9, wherein the patch management module is further configured to:
determine that a particular blocked application in the first set of applications includes a vulnerability targeted by the software update; and
based on the determination, install the software update on the network device hosting the particular application.

13. The system of claim 12, wherein the patch management module is further configured to test the particular application to verify whether the installation of the software update corrected the vulnerability, and wherein the application management module is further configured to unblock the particular application based on the testing.

14. The system of claim 9, wherein the application data stored in the database comprises a list of applications and application versions residing on the respective network devices.

15. The system of claim 9, wherein the patch management module is further configured to determine, based on the application data, a second set of applications from among the plurality of software applications that correspond to a known vulnerability, and wherein the application management module is configured to block execution of the second set of applications.

16. The system of claim 15, further comprising a quarantine module configured to:
receive a request to connect a new network device to the network; and limit the new network device's network connection to communication with the patch management module until the patch management module determines that the new network device does not include the known vulnerability.

17. A computer readable medium having stored thereon computer executable instructions for performing a method for pre-emptively blocking execution of software applications in a network, the method comprising:
storing application data in a network database, the application data corresponding to a plurality of software applications hosted by respective network devices;
based on the application data, determining a first set of applications from among the plurality of software applications that correspond to a software update; and
setting the first set of applications in a default mode, wherein access to the first set of applications is blocked while in the default mode.

18. The computer readable medium of claim 17, wherein the method further comprises allowing a user to manually unblock access to a particular application in the first set of applications.

19. The computer readable medium of claim 17, wherein the method further comprises:
determining that a particular blocked application in the first set of applications does not include a vulnerability targeted by the software update; and
based on the determination, unblocking access to the particular application.

20. The computer readable medium of claim 17, wherein the method further comprises:
determining that a particular blocked application in the first set of applications includes a vulnerability targeted by the software update; and
based on the determination, installing the software update on the network device hosting the particular application.

21. The computer readable medium of claim 20, wherein the method further comprises:
testing the particular application to verify whether the installation of the software update corrected the vulnerability; and
based on the testing, unblocking access to the particular application.

22. The computer readable medium of claim 17, wherein the method further comprises:
based on the application data, determining a second set of applications from among the plurality of software applications that correspond to a known vulnerability; and
blocking access to the second set of applications.

23. A method for pre-emptively blocking execution of software applications in a network, the method comprising:
storing application data in a network database, the application data corresponding to a plurality of software applications hosted by respective network devices;
based on the application data, determining a set of applications from among the plurality of software applications that correspond to a known vulnerability; and
setting the set of applications in a default mode, wherein access to the set of applications is blocked while in the default mode.

24. The method of claim 23, further comprising:
determining that a software update is available to correct the vulnerability; and
based on the determination, installing the software update on the respective network devices hosting the set of applications.

25. The method of claim 24, further comprising:
determining whether the installation of the software update corrected the vulnerability; and
based on the testing, unblocking access to the set of applications.

* * * * *